Figure 2:
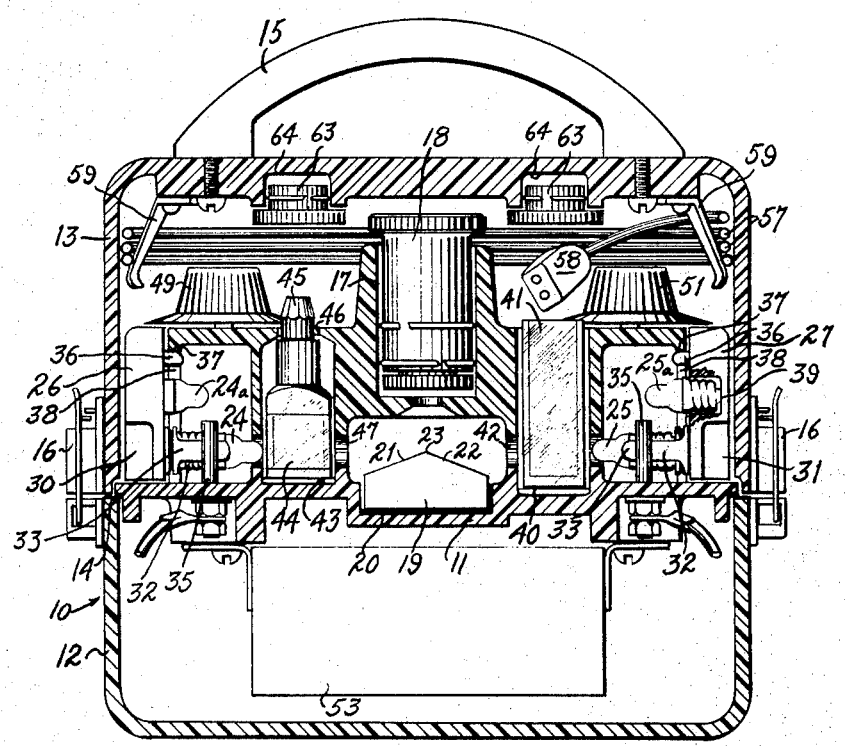

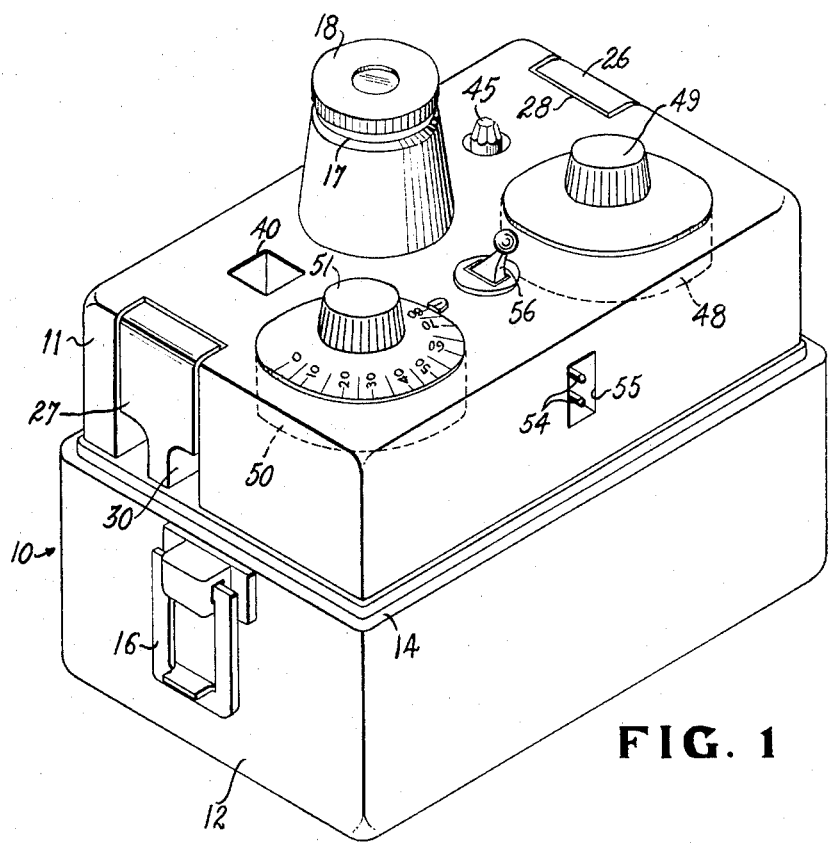
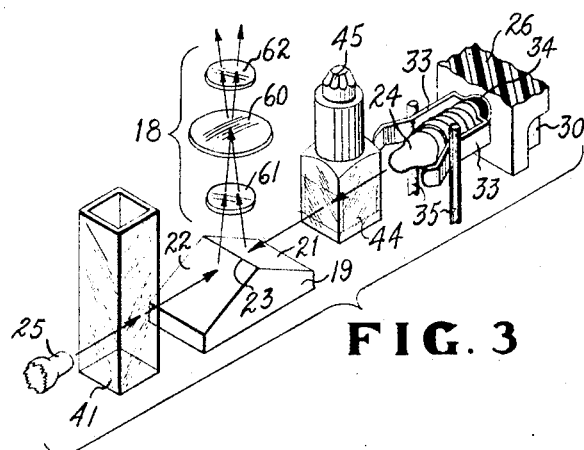

INVENTORS
ORA A. HARVEY
BY TRUMAN WOODMANSEE

UNITED STATES PATENT OFFICE 2,555,744

COLORIMETER

Ora A. Harvey and Truman Woodmansee, Indianapolis, Ind., assignors to Eli Lilly and Company, Indianapolis, Ind., a corporation of Indiana Application August 12, 1948, Serial No. 43,786

3 Claims. (Cl. 88—14)

This invention relates to colorimeters and more particularly to colorimeters of the visual type.

It is an object of the invention to provide a colorimeter which is especially adapted for use in clinical laboratory work and the like.

Another object of the invention is to provide an instrument of this character which eliminates the use of relatively expensive elements such as precision lenses, prisms, photoelectric cells, galvanometers, etc.

A further object is to provide a colorimeter which is simple in design, construction and operation, composed of few and relatively inexpensive parts and which is reliably operative and accurate in performing determination of the comparative values of test solutions.

A still further object is to provide an instrument of this character in which the parts are arranged in compact form within a handy carrying case and to provide means whereby certain of the expendable parts may be readily removed from the assembly for inspection and replacement without disturbance to other parts of the assembly.

With the above and other objects in view the invention consists in the combination and arrangement of parts, hereinafter more fully described in connection with the accompanying drawings, and particularly pointed out in the appended claims.

Figure 4:
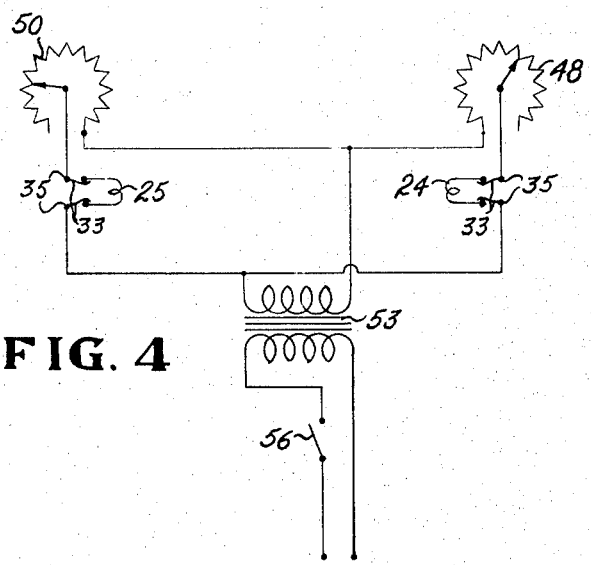

In the drawings:

Fig. 1 is an isometric view of the improved colorimeter taken from the rear of the instrument case and with the cover removed, Fig. 2 is a sectional elevation of the instrument with the cover in position, Fig. 3 is a diagrammatic perspective view illustrating the general arrangement of certain of the elements, and Fig. 4 is a wiring diagram of the electrical circuit.

Referring to Figs. 1 and 2, the instrument includes a base indicated generally at 10 and comprising upper and lower sections 11 and 12, respectively. A cover 13 is adapted to seat upon a shoulder 14 formed along the junction where lower section 12 meets with upper section 11. Cover 13 is provided with a carrying handle 15 and is adapted to be removably secured on the base by latches 16. Centrally and to one side of the top of upper section 11 there is provided a cylindrical chamber 17 adapted to receive and support an eyepiece 18 in spaced relation above a light-comparison block or wedge 19 suitably supported in a recess 20 formed in upper section 11. Wedge 19 is formed with two angularly disposed light-reflecting surfaces 21, 22 which meet at a common line 23. An opening 17a in the lower end of chamber 17 defines that area of the surfaces 21, 22 on opposite sides of the line 23 which may be viewed through eyepiece 18. Preferably the surfaces 21, 22 have a matte finish such as would be provided, for example, as by forming the wedge of calcium carbonate, the purpose being to secure non-specular reflection of light.

For projecting light beams upon the surfaces 21, 22 there is provided a pair of oppositely disposed sources of artificial light such as electric light bulbs 24, 25 (Figs. 2 and 3). The bulbs preferably are of the lens-end type and are adapted to operate on voltages of the order of 2.2 v., the advantage of utilizing such lens-end bulbs being that beams of substantially uniform intensities may be projected toward and upon the surfaces 21, 22 without the necessity of using auxiliary light focusing means. Bulbs 24 and 25 are mounted, respectively, in adaptors 26 and 27 removably mounted in oppositely disposed recesses 28 and 29 provided in upper section 11 of base 10, the arrangement being such that when the adaptors are inserted within the recesses, the outwardly disposed end and upper surfaces of the adaptors lie flush with the end walls and top surface of section 11. Toward their lower ends, the adaptors are cut away at the opposite sides thereof as clearly shown in Fig. 1 to form finger gripping members 30 and 31 which serve to facilitate the mounting and demounting of the adaptors.

The inner face of each adaptor carries a bulb receiving socket 32 and a pair of spaced, inwardly projecting prongs 33 (Fig. 3) of spring material. Each prong is suitably connected to one of the two conventional terminals of its associated socket and is insulated from the other by an insulating collar such as 34 (Fig. 3). When adaptors 26, 27 are mounted within their recesses 28, 29 prongs 33 frictionally engage spaced, upstanding rods 35 secured in electrically insulated condition in section 11. The spring tension engagement of prongs 33 with rods 35 serves to establish an electric contact with the rods and also to frictionally retain the adaptors 26 and 27 with their light bulbs 24 and 25 in proper mounted position as shown in the drawings. Inwardly projecting locating pins 36 may be provided on adaptors 26 and 27. These locating pins may be arranged to engage the under edges 37 of openings 38 provided in the inner faces of recesses 28 and 29 to permit the introduction of light bulbs 24 and 25. Above the socket 32 of each adaptor there is provided a recess 39 of just sufficient diameter to snugly receive and retain a replacement lens-end bulb 24a, 25a.

Intermediate bulb 25 and surface 22 of wedge 19 there is provided in section 11 a chamber 40, preferably of rectangular cross section and adapted to receive an absorption cell or transparent specimen container 41 in interposed relation between bulb 25 and surface 22. The opposite end walls of chamber 40 are provided with aligned apertures 42 of just sufficient size to permit a substantial beam of light from bulb 25 to pass therethrough and be projected toward and upon the light-reflecting surface 22. Likewise, intermediate to bulb 24 and surface 21 of wedge 19 there is provided in section 11 a chamber 43. Chamber 43 at its lower end is preferably rectangular in cross section and is adapted to receive in interposed relation between bulb 24 and surface 21 a neutral-density filter 44 formed of "Lucite" or other suitable transparent material. The interposition of the neutral density filter 44 between bulb 24 and its associated reflecting surface 21 reduces the intensity of the beam from bulb 24 so that it is approximately within the range of intensity of bulb 25 when a specimen is being examined. This is important in that both light bulbs may thus be operated in the same range of voltage and color temperature whereby more uniform results in matching the surfaces 21 and 22 are obtainable. While the lower end of filter 44 may be either solid or hollow the upper portion thereof is preferably solid and has a reduced upwardly projecting faceted end 45 extending through an opening 46 provided in the upper end of chamber 43, for purposes to be later described. The opposite end walls of chamber 43 are provided with aligned apertures 47 of just sufficient size to permit a beam of light from bulb 24 to pass therethrough and be projected toward and upon the light reflecting surface 21.

A variable resistor 48 (Fig. 1) having a control knob 49 is associated with bulb 24 to regulate its intensity. Likewise, a variable resistor 50 and a control knob and dial 51 are associated with bulb 25 to regulate its intensity. The dial 51 is calibrated and readable against a stationary index 52, provided on the top of section 11. Resistors 48 and 50 are connected in series with their respective bulbs 24 and 25 as shown in the wiring diagram of Fig. 4. Current may be supplied by batteries, preferably of the mercury cell type or, as shown, may be supplied from a suitable 110–125 A. C. source stepped down through a flux saturated or saturation transformer 53 which is mounted, as shown in Fig. 3, to the underside of section 11 and completely encased by section 12. The input leads of the transformer are connected to plug terminals 54 (Fig. 1) mounted in a recess 55 of upper section 11, an on-off switch 56 being interposed in one of the input leads. The output leads of the transformer are connected across the bulb and resistor circuits as shown in Fig. 4.

An electric cord 57 for connecting the instrument to a wall outlet has a plug 58 at one end engageable with the terminals 54 and a conventional outlet plug (not shown) at its other end is stored, when not in use, within cover 13, the cord being wound around depending spring clips 59 secured adjacently to the four inner corners of the cover.

Referring to Fig. 2, eyepiece 18 comprises a simple convex lens 60 and at its lower end has removably mounted therein a monochromatic green filter 61 (Fig. 3) this color having been found to be most generally satisfactory in performing numerous tests. A dust glass 62 mounted above lens 61 completes the eyepiece assembly. It will be understood that different tests may require different color filters. As noted above, the color filter 61 is frictionally and removably mounted in the lower opening of eyepiece 18. Additional interchangeable filters 63 of different colors are removably and frictionally retained within suitable recesses 64 provided in the under side of cover 13 as shown in Fig. 2.

It will be noted from the foregoing that there is provided a compact, sturdy, self-contained instrument which may be readily set into operation in the manner now to be described.

With the cover removed the electric cord 57 is detached from the clips 59 and its plug 58 connected with the terminals 54, the wall outlet plug (not shown) being inserted in a suitable electric supply outlet of proper voltage. The switch 56 is then thrown to "on" position. This causes bulbs 24 and 25 to project their light beams upon the light-reflecting surfaces 21 and 22. As the light beam from the bulb 24 passes through the neutral density filter 44 certain of its rays are transmitted through the solid upwardly extending portion and reflected from the projecting faceted end 45 which serves to signal the operator that the device is now in readiness for test operations to be performed.

The tests are performed generally as follows:

The instrument is initially standardized by filling specimen tube 41 with that solvent which is to be used in the particular solution to be tested and the tube inserted in chamber 40. Resistor knob 51 is adjusted with respect to index 52 so that the dial reading is zero. While observing wedge 19 through eyepiece 18, resistor knob 49 is rotated until the intensities reflected from the surfaces 21, 22 of wedge 19 appear equal (i. e., when the dividing line 23 is no longer discernible). It is here noted that the position of the neutral density filter 44 allows for greater variation of the intensity of bulb 25 in the standardization procedure. Following this standardization, the solvent in tube 41 is replaced by the solution to be tested and resistor knob 51 adjusted until the surfaces 21 and 22 are again matched whereupon the reading is taken from the calibrated dial associated with knob 51. Densities of additional test solutions using the same solvent may be determined without again standardizing the instrument. The dial readings may be compared against a table of standards previously set up according to conventional practice, and upon which the dial values are correlated to values representative of the particular information sought.

What is claimed is:

1. In a colorimeter, a substantially opaque comparison wedge stationarily mounted and having a pair of oppositely disposed oblique surfaces meeting at a common edge, a pair of light bulbs, each of said bulbs being disposed to project a beam of light upon one of said surfaces, adjustable resistance means connected with each bulb to vary the intensity thereof, a casing enclosing said wedge and said bulbs, said casing having one opening therein adapted to receive a transparent specimen container in interposed relation between one of said light bulbs and one of said wedge surfaces, a transparent neutral density filter supported in interposed relation between the other of said light bulbs and the other of said wedge surfaces, said casing having a second opening therein through which a portion of said neutral density filter projects to serve as a signal means, and an eyepiece supported on said casing oppositely to said wedge surfaces.

2. In a transmission colorimeter; a casing; a pair of spaced, oppositely disposed light sources; an eyepiece mounted on said casing; an opaque wedge having a pair of oppositely inclined, reflecting comparison surfaces, said wedge being stationarily mounted between said light sources with its apex centered with respect to and at least portions of its comparison surfaces viewable through said eyepiece to reflect direct rays of light from said sources thereinto; a removable, transparent specimen container; means in said casing for interposing said specimen container between one of said light souces and one of said comparison surfaces; and adjusting means for independently varying the intensity of said light sources, the adjusting means of the light source associated with said specimen container having scale means thereon for taking readings; whereby, through operation of the adjusting means, the light intensities reflected from both of said comparison surfaces can be independently equalized prior to the introduction of a test solution in said specimen container, and can again be equalized by operation of said scaled adjusting means after the introduction of said test solution in said specimen container, the scale readings obtained by said adjustments giving a determination of the comparative value of said test solution.

3. In a transmission colorimeter; a casing; a pair of spaced, oppositely disposed light bulbs; an eyepiece mounted on said casing; an opaque wedge having a pair of oppositely inclined, reflecting comparison surfaces, said wedge being stationarily mounted between said light bulbs with its apex centered with respect to and at least portions of its comparison surfaces viewable through said eyepiece to reflect direct rays of light from siad bulbs thereinto; a removable, transparent specimen container; means in said casing for interposing said specimen container between one of said light bulbs and one of said comparison surfaces; and variable electrical resistor means associated with said light bulbs for independently adjusting the intensity thereof, the resistor means of said light bulb associated with said specimen container having scale means thereon for taking readings; whereby, through operation of the resistor means, the light intensities reflected from both of said comparison surfaces can be independently equalized prior to introduction of a test solution in said specimen container, and can again be equalized by operation of said scaled resistor means after the introduction of said test solution in said specimen container, the scale readings obtained by said adjustments giving a determination of the comparative value of said test solution.

ORA A. HARVEY.
TRUMAN WOODMANSEE.

REFERENCES CITED

The following references are of record in the file of this patent:

UNITED STATES PATENTS

| Number | Name | Date |
|---|---|---|
| 1,143,675 | Whitney | June 22, 1915 |
| 1,252,598 | Macbeth | Jan. 8, 1918 |
| 1,883,971 | Kryzanowsky | Oct. 25, 1932 |
| 2,190,553 | Tarr | Feb. 13, 1940 |
| 2,221,916 | Forrest et al. | Nov. 19, 1940 |
| 2,386,878 | Nickerson | Oct. 16, 1945 |